(12) United States Patent
Lis et al.

(10) Patent No.: US 10,479,443 B2
(45) Date of Patent: Nov. 19, 2019

(54) ENERGY HARVESTING POWER-ASSIST SYSTEM AND METHOD FOR LIGHT VEHICLES

(71) Applicants: Fabian Lis, Newton, MA (US); Gustavo Adrian Lis, Calgary (CA)

(72) Inventors: Fabian Lis, Newton, MA (US); Gustavo Adrian Lis, Calgary (CA)

(*) Notice: Subject to any disclaimer, the term of this patent is extended or adjusted under 35 U.S.C. 154(b) by 140 days.

(21) Appl. No.: 15/572,530

(22) PCT Filed: Nov. 6, 2016

(86) PCT No.: PCT/US2016/060744
§ 371 (c)(1),
(2) Date: Nov. 8, 2017

(87) PCT Pub. No.: WO2017/079709
PCT Pub. Date: May 11, 2017

(65) Prior Publication Data
US 2018/0154981 A1    Jun. 7, 2018

Related U.S. Application Data

(60) Provisional application No. 62/252,568, filed on Nov. 8, 2015.

(51) Int. Cl.
*B62M 6/50*       (2010.01)
*B62M 6/55*       (2010.01)
*B62M 6/90*       (2010.01)

(52) U.S. Cl.
CPC ............... *B62M 6/50* (2013.01); *B62M 6/55* (2013.01); *B62M 6/90* (2013.01)

(58) Field of Classification Search
CPC . B62M 6/50; B62M 6/90; B62M 6/45; B62M 6/80; B62M 6/55; B62M 11/145; H02N 2/18
USPC ........................................................ 180/206.3
See application file for complete search history.

(56) References Cited

U.S. PATENT DOCUMENTS

| | | | | |
|---|---|---|---|---|
| 5,599,244 | A * | 2/1997 | Ethington | B62M 9/122 280/261 |
| 5,758,736 | A * | 6/1998 | Yamauchi | B62M 6/45 180/220 |
| 6,015,159 | A * | 1/2000 | Matsuo | B62M 25/00 280/236 |
| 2009/0181826 | A1* | 7/2009 | Turner | B62M 6/50 482/4 |
| 2010/0290259 | A1* | 11/2010 | Liao | H02P 9/48 363/74 |

(Continued)

*Primary Examiner* — Kevin Hurley
*Assistant Examiner* — Felicia L. Brittman
(74) *Attorney, Agent, or Firm* — Robert Kaim

(57) ABSTRACT

Disclosed is an energy harvesting power-assist system and method for human powered light vehicles. The power-assist system comprises a drive mechanism, one or more motor/generators and a high capacity storage device. The system continuously harvests and stores energy which is converted to motion by the motors, providing additional power to the user's pedaling. A controller determines the amount of pedal assist based on a user's preset value, and manages the charge and discharge of the high capacity storage device. As such, the system does not require any other external energy source, and the storage device never needs external charging under the described usage cases.

26 Claims, 17 Drawing Sheets

(56) References Cited

U.S. PATENT DOCUMENTS

| | | | |
|---|---|---|---|
| 2012/0012412 A1* | 1/2012 | Moeller | B62M 6/45 180/206.2 |
| 2012/0061161 A1* | 3/2012 | Jang | B62J 6/14 180/220 |
| 2016/0039496 A1* | 2/2016 | Hancock | G01S 19/19 701/60 |
| 2016/0176473 A1* | 6/2016 | Faille | B62M 6/50 74/661 |
| 2017/0225742 A1* | 8/2017 | Hancock | B60L 58/12 |

* cited by examiner

Section A-A

ENERGY HARVESTING POWER-ASSIST SYSTEM AND METHOD FOR LIGHT VEHICLES

CROSS-REFERENCE TO RELATED APPLICATIONS

This application claims the benefit and priority of U.S. Provisional patent application Ser. No. 62/252,568 filed Nov. 8, 2015 entitled HUMAN-ELECTRIC POWERED (HEP) HYBRID TRANSAXLE DRIVE APPARATUS AND METHOD FOR LIGHT VEHICLES, the entire disclosure of which is incorporated herein by reference.

FIELD OF THE INVENTION

The invention relates to power-assisted light vehicles in which human power is supplemented by electric power, and in particular to an energy-harvesting system which requires no external electrical charging and thus has unlimited range.

BACKGROUND OF THE INVENTION

Power-assisted light vehicles such as bicycles, pedicabs and wheelchairs are well known in existing practice. Many such vehicles employ electrical power-assist with an electrical energy storage device such as a battery. However, all such vehicles in existing practice have limited range of operation due to the finite storage capacity of the energy storage device. Once the stored energy has been exhausted, power-assist is no longer available until there is access to an external energy source which can re-charge the storage device. Such limited range is a severe disadvantage which detracts from the usefulness of these devices in existing practice.

There therefore exists a need for a power-assist system which does not require any external charging and therefore has effectively unlimited range.

SUMMARY OF THE INVENTION

Accordingly, it is a general objective of the present disclosure to have an apparatus and method for providing power-assist with unlimited range of operation.

It is further an objective of the present disclosure to have an apparatus and method for providing power-assist to the user when there is a power demand that exceeds a preset value which is selected by the user based on a desired level of effort.

These objectives are achieved with a closed energy system wherein energy is continuously harvested and stored in a high capacity energy storage device. This energy is available for later use when there is a demand for power-assist. The system does not require any other external energy source and hence never needs to be charged under the described usage cases.

DETAILED DESCRIPTION OF PREFERRED EMBODIMENT

Figure 1A:
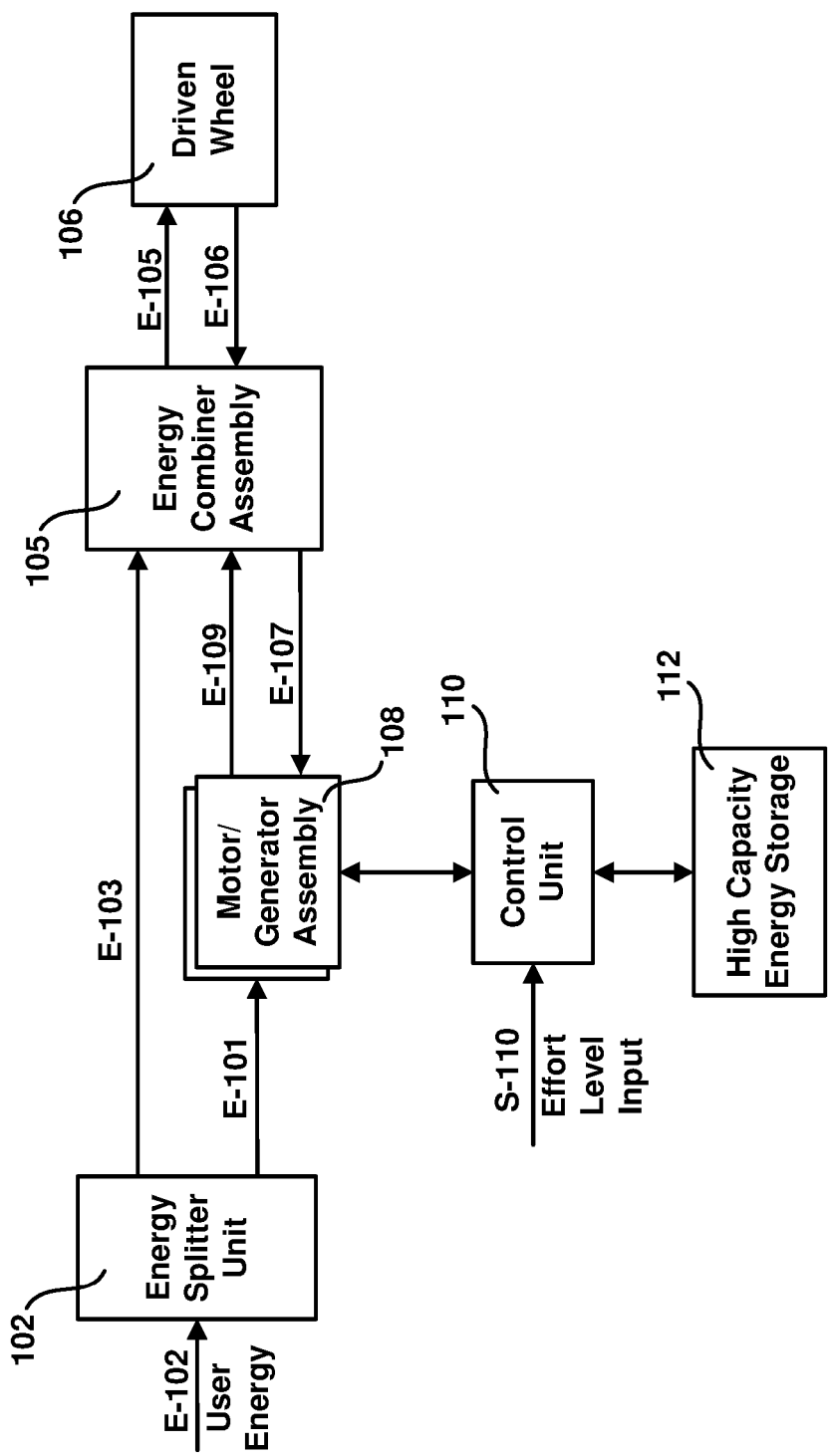
FIG. 1A is a schematic representation of an energy harvesting power-assist system according to the present disclosure.

Note that in the description below, and in the figures, energy flows are labeled using the convention E-XXX, where XXX is the reference numeral of the energy flow being considered. Also in the description and figures, information signal lines are labeled using the convention S-YYY, where YYY is reference numeral of the signal line being considered.

Overview of Apparatus and Method

FIG. 1A is a schematic representation of an energy harvesting power-assist system for a light vehicle according to the present disclosure. The user applies user energy E-102 to an energy splitter unit 102 which splits a small amount E-101 of the user energy for storage in a high capacity storage unit 112. The magnitude of split energy E-101 depends on the operating mode of the light vehicle (see section on "Power Management" below), but in general split energy E-101 may comprise from 1% to 20% of user energy E-102. Split energy E-101 is converted to electrical energy by a motor/generator assembly 108 operating in generator mode, via a control unit 110 which controls the flow of energy between high capacity storage unit 112 and motor/generator assembly 108. A larger remaining proportion E-103 of user energy E-102 is directed to an energy combiner assembly 105 which combines energy E-103 with energy E-109 from motor/generator assembly 108 operating in motor mode. The energy output E-105 of energy combiner assembly 105 is applied to a driven wheel 106 of the light vehicle.

In kinetic energy harvesting mode, kinetic energy E-106 may be recovered from wheel 106 and transmitted as energy E-107 to motor/generator assembly 108 operating in generator mode, which converts the kinetic energy to electrical energy for storage in high capacity storage unit 112.

Control unit 110 receives a user-defined effort level input signal S-110 which defines the desired maximum level of user energy E-102. If the required effort level is greater than effort level input S-110, control unit 110 will cause motor/generator assembly 108 to draw energy from high capacity storage unit 112, and to deliver energy E-109 to provide power-assist to the user. If the required effort level is less than effort level input S-110, control unit 110 will cause motor/generator assembly 108 to either receive recovered kinetic energy E-107 or to harvest split energy E-101 for conversion to electrical energy and storage in high capacity storage unit 112. Note that, while the user is applying user energy E-102, split energy E-101 is continuously available for conversion and storage in high capacity storage unit 112.

Figure 1B:
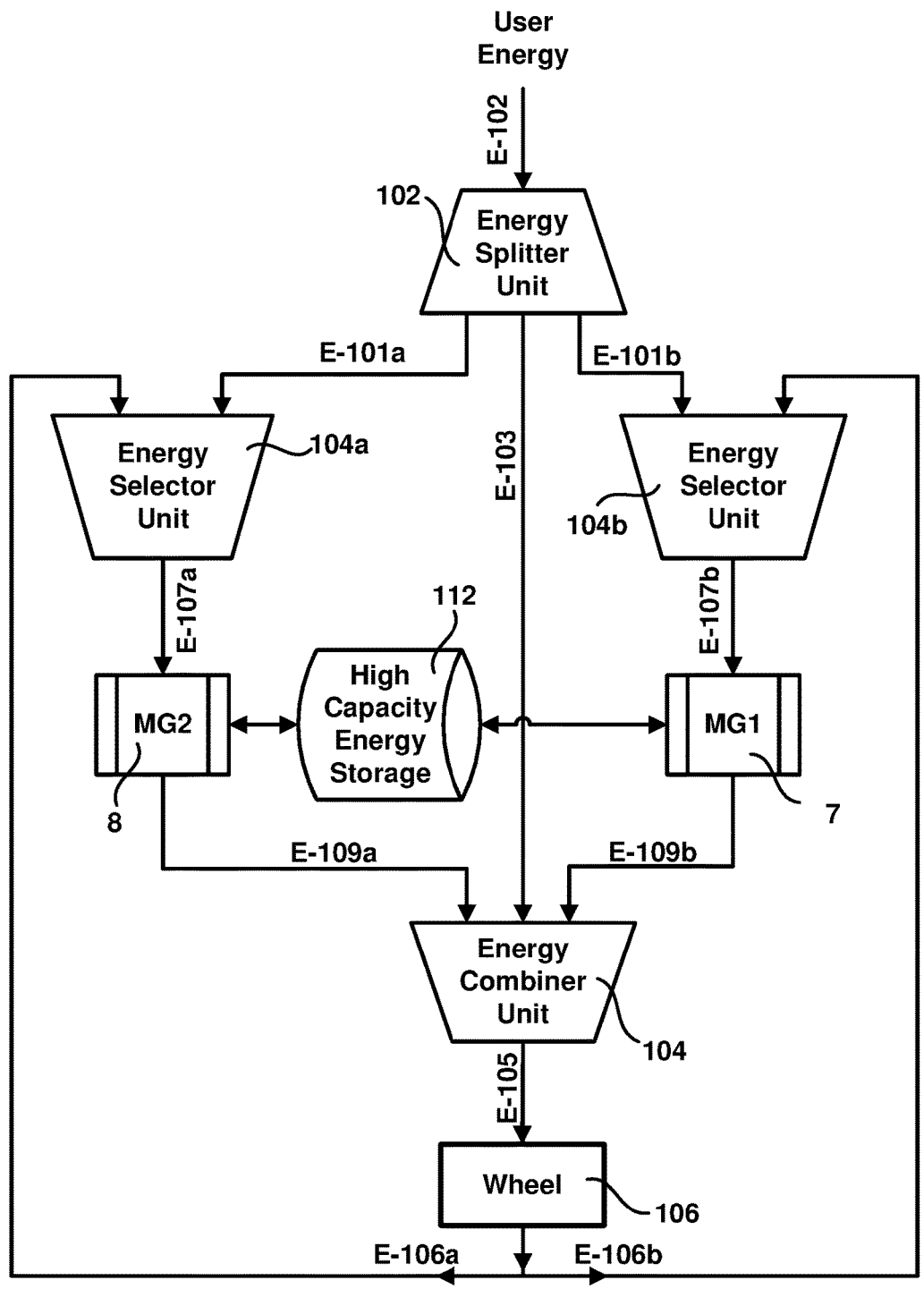
FIG. 1B is a conceptual representation of the theory of operation of an embodiment of an energy harvesting power-assist system according to the present disclosure.

FIG. 1B is a conceptual representation of the theory of operation of an embodiment of the energy harvesting power-assist system. In the illustrated embodiment, motor/generator assembly 108 comprises a first motor/generator 7 (MG1) and a second motor generator 8 (MG2). Energy combiner assembly 105 comprises an energy combiner unit 104, an energy selector unit 104a and an energy selector unit 104b.

In the embodiment of FIG. 1B, energy splitter unit 102 splits a small amount E-101a and E-101b of user energy E-102 for storage. Energy selector units 104a and 104b are configured to transmit either split energy components E-101a and E-101b respectively, or kinetic energy components E-106a and E-106b respectively. The outputs of energy selector units 104a and 104b are selected energies E-107a and E-107b respectively and the selected energies are transmitted to MG2 and MG1 respectively. Energy selector units 104a and 104b are configured to operate independently of one another, thereby providing four possible outputs as shown in Table 1.

TABLE 1

|  | E-107a | E-107b |
| --- | --- | --- |
| Case 1 | E-101a | E-101b |
| Case 2 | E-101a | E-106b |
| Case 3 | E-106a | E-101b |
| Case 4 | E-106a | E-106b |

Selected energies E-107b and E-107a are converted to electrical energy by MG1 and MG2 respectively, operating in generator mode. The electrical energy is stored in high capacity energy storage device 112.

The stored energy is available for later use and may be converted back to mechanical energy by MG1 and/or MG2 operating in motor mode. One or both motors may engage depending on the level of power-assist demanded. Energy combiner unit 104 combines all energy sources, namely E-103 from the user and E-109b and E-109a from MG1 and MG2 respectively, operating in motor mode. Energy output E-105 from energy combiner unit 104 is transferred to driven wheel 106 of the light vehicle.

In an embodiment, energy splitter unit 102, energy combiner unit 104, and energy selector units 104a and 104b may all be implemented by means of a single electro-mechanical assembly as described below.

Figure 1C:
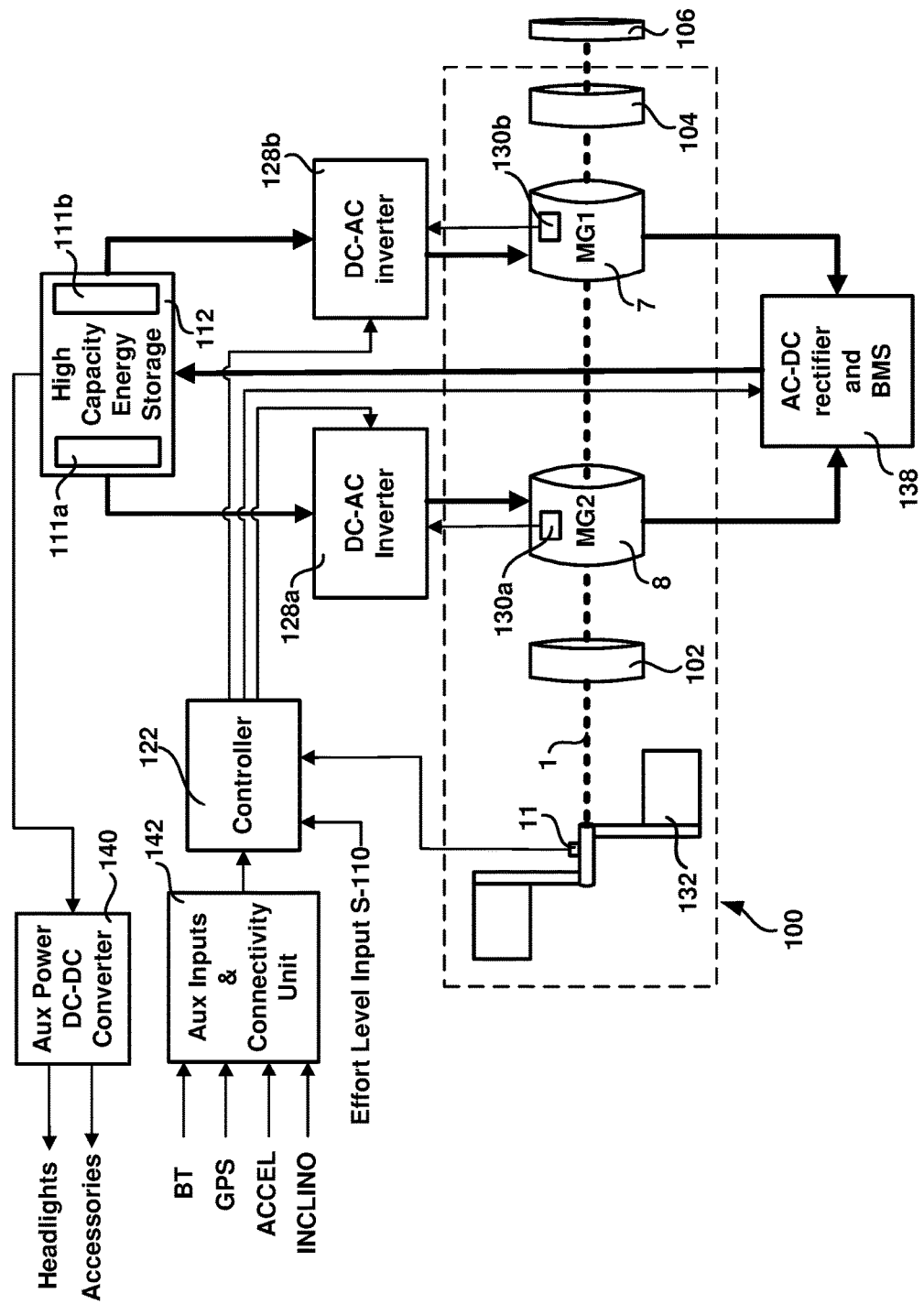
FIG. 1C is a schematic showing details of an embodiment of an energy harvesting power-assist system according to the present disclosure.

FIG. 1C shows a schematic representation of the apparatus of an embodiment of the light vehicle power-assist system. The system consists of a drive assembly 100, electronic control unit 110 and high capacity energy storage device 112. Drive assembly 100 comprises pedals 132, a crank axle 1, energy splitter unit 102, motor/generators MG1 and MG2, energy combiner unit 104, and energy selector units 140a and 104b (not shown). Drive assembly 100 also includes a sprocket and chain (see FIG. 10), or other mechanical connection system, to transfer power to wheel 106. In an embodiment, MG1 and MG2 are coreless dual Halbach array permanent magnet axial AC motor/generators.

High capacity energy storage device 112 comprises a plurality of high capacity storage elements 111, comprising ultra-capacitors 111a, hereinafter referred to as UCAP, and high capacity battery cells 111b, hereinafter referred to as BAT. UCAP 111a functions as short term energy cache storage, handling peak demands of less than about 10 minutes' duration with many rapid charge/discharge cycles, while BAT 111b provides energy for longer term demands of greater than about 10 minutes' duration. In an embodiment, high capacity battery cells 111b may comprise Li ion battery cells. In a further embodiment, ultra-capacitors 111a may comprise thin supercapacitors.

Note that control unit 110 is configured to control high capacity storage elements 112 so that BAT 111b always retains a minimum energy level, but UCAP 111a may be fully depleted.

Electronic control unit 110 comprises a controller 122, DC-AC inverters 128a and 128b, an AC-DC rectifier and battery management system (BMS) 138, an auxiliary inputs and connectivity unit 142, and an auxiliary power DC-DC converter 140.

The DC energy stored in energy storage device 112 is converted to AC current by DC-to-AC inverters 128a and 128b. The AC output of DC-to-AC inverters 128a and 128b feeds motor/generators MG2 and MG1 respectively (motor mode). MG2 and MG1 include a plurality of Hall effect sensors, 130a and 130b respectively, which feed back rotor phase information from MG2 and MG1 to DC-to-AC inverters 128a and 128b respectively. High capacity energy storage device 112 is charged by motor/generators MG1 and MG2 (generator mode). MG1 and MG2 are connected to AC-DC rectifier and BMS 138 which provides the charge to high capacity energy storage device 112. Controller 122 controls DC-AC inverters 128a and 128b, and AC-DC rectifier and BMS 138 in a closed loop, with closed loop control feedback being provided by a torque and cadence (RPM) sensor 11 mounted in crank axle 1. The feedback loop reference is effort level input S-110 selected by the user.

Auxiliary power DC-DC converter 140 converts part of the stored energy in high capacity energy storage device 112 to a suitable voltage to power headlights and other accessories (e.g. a mobile phone). Auxiliary inputs and connectivity unit 142 has two main functions:

(a) There is provision for inputs from various sensors, such as a Global Positioning System (GPS), an accelerometer (ACCEL), and an inclinometer (INCLINO), all of which may be used to improve the utility of the apparatus and method described herein; and (b) There is connectivity to a BLUETOOTH (BT) module, wherein BLUETOOTH is a trademarked communication protocol which is used for communication between the apparatus and a mobile phone. In an embodiment, the BT connection may be the method by which the user enters effort level input S-110 by means of a mobile phone.

Energy splitter 102 is capable of splitting a small energy amount from crank axle 1 to motor/generators MG1 and MG2. This energy is stored in high capacity energy storage device 112 for later use. Storage of user split energy E-101 occurs as long as the user is pedaling. If the user is not pedaling but the light vehicle is still in motion, storage of kinetic energy E-106 occurs. In either case, controller 122 determines the amount of energy to store based on storage depletion levels in high capacity energy storage device 112. Controller 122 also determines if there is a need for power-assist, and if so, stored energy from high capacity energy storage device 112 is converted to mechanical energy by motors MG1 and MG2, and is transferred to light vehicle wheel 106 through a sprocket system which is described below. A mechanical embodiment of drive assembly 100 is described in further detail in the Description of Mechanical Embodiment section below.

Description of Mechanical Embodiment

This section provides a detailed description of mechanical embodiments of the power-assist system. The description is made with reference to FIGS. 9-16.

Figure 9:
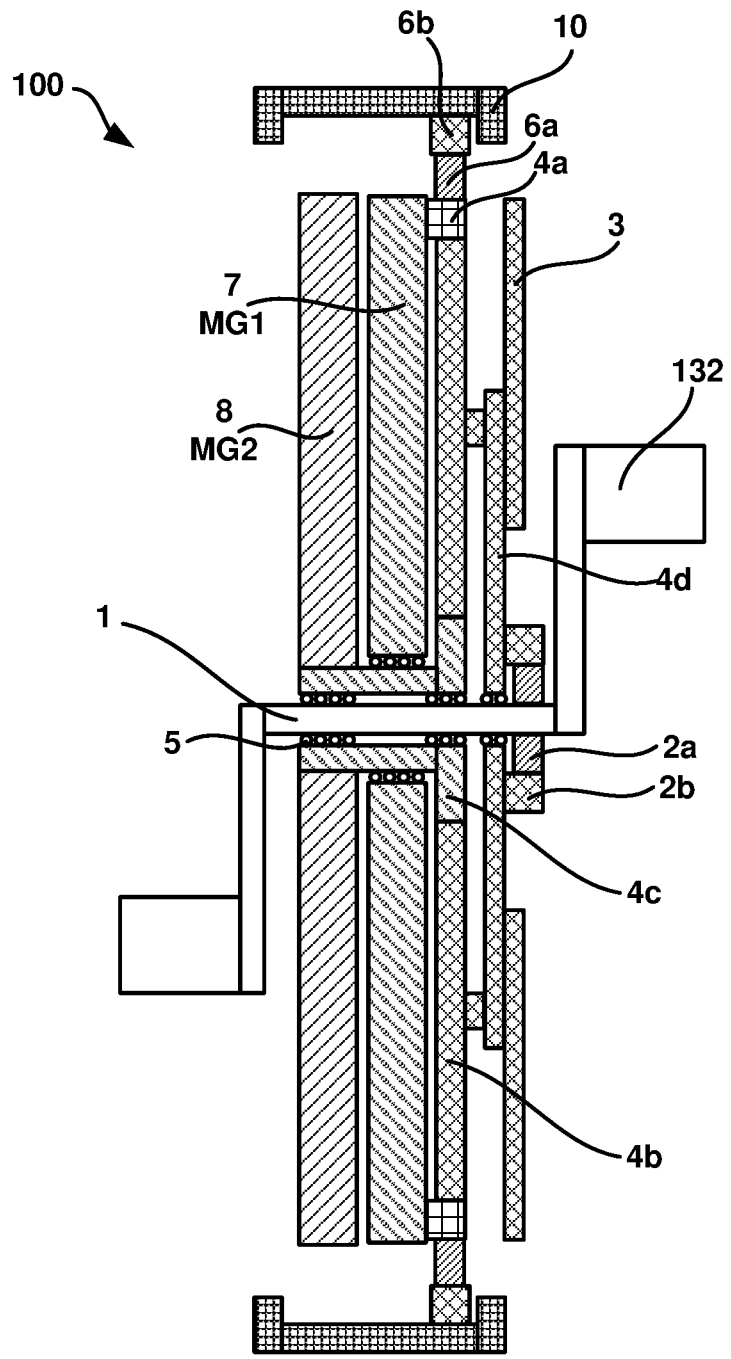
FIG. 9 is a schematic of a drive assembly according to the present disclosure.
Figure 10:
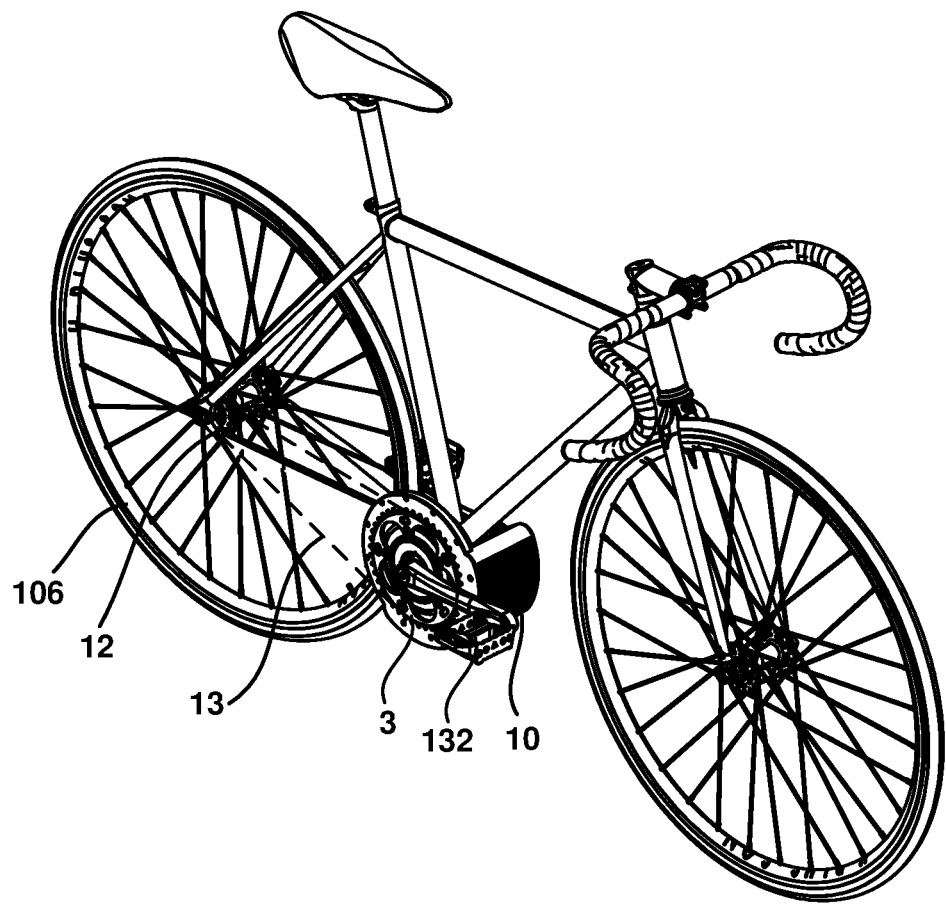
FIG. 10 shows an energy harvesting power-assist system according to the present disclosure mounted on a bicycle.

FIG. 9 shows a schematic of drive assembly 100, and FIG. 10 shows an example of the power-assist system, including drive assembly 100, mounted on a bicycle. Referring to FIG. 9, a front sprocket ratchet 2 comprises an inside front sprocket ratchet 2*a* and an outside front sprocket ratchet 2*b*. Crank axle 1 is the axle of drive assembly 100 and is connected to inside front sprocket ratchet 2*a*. A front sprocket 3 is connected to outside front sprocket ratchet 2*b*. Front sprocket ratchet 2 forms a one-way clutch that transfers torque from pedals 132 to front sprocket 3 in the clockwise (CW) direction only, and decouples front sprocket 3 from crank axle 1 in the counter clockwise (CCW) direction. When crank axle 1 rotates in CW direction faster than front sprocket 3, the user's generated torque is transferred from the crank axle 1 to front sprocket 3, otherwise torque is not transferred.

Front sprocket 3 is the power output element where the torques of the user and motors MG1/MG2 are combined, and as such it is a mechanical embodiment of energy combiner assembly 105. As shown in FIG. 10, power from front sprocket 3 may be transferred to a rear sprocket 12 by a chain or belt 13. Rear sprocket 12 is fixed to the axle of light vehicle wheel 106 such that rotation of wheel 106 may drive rotation of front sprocket 3 through chain or belt 13 when the speed of rotation of rear sprocket 12 is greater than the speed of rotation of crank axle 1. This driven rotation of front sprocket 3 forms the basis of kinetic energy recovery as illustrated by harvested kinetic energy E-106*a* and E-106*b* in FIG. 7.

Figure 11A:
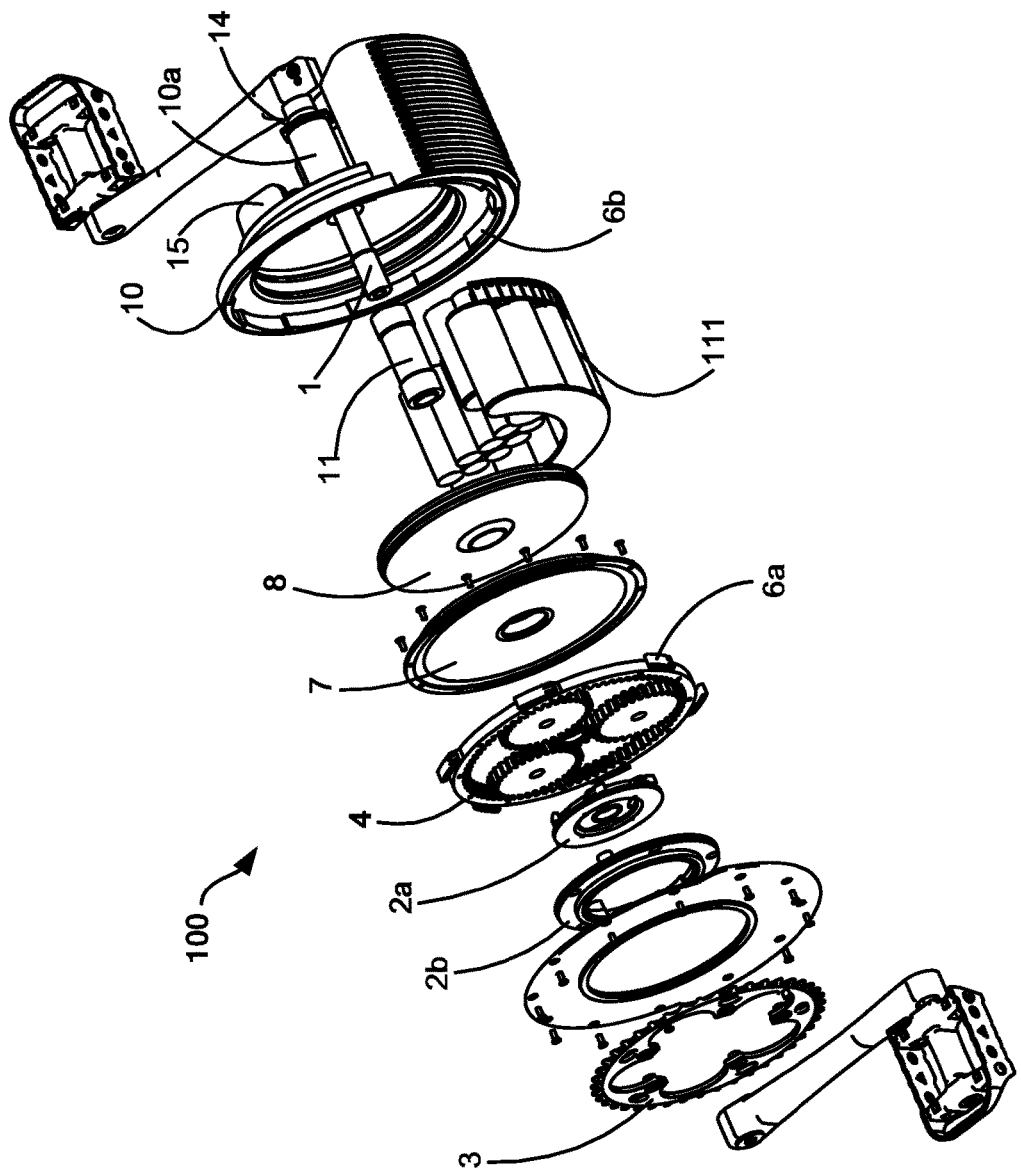
FIG. 11A is a right side exploded isometric view of a drive assembly according to the present disclosure.
Figure 11B:
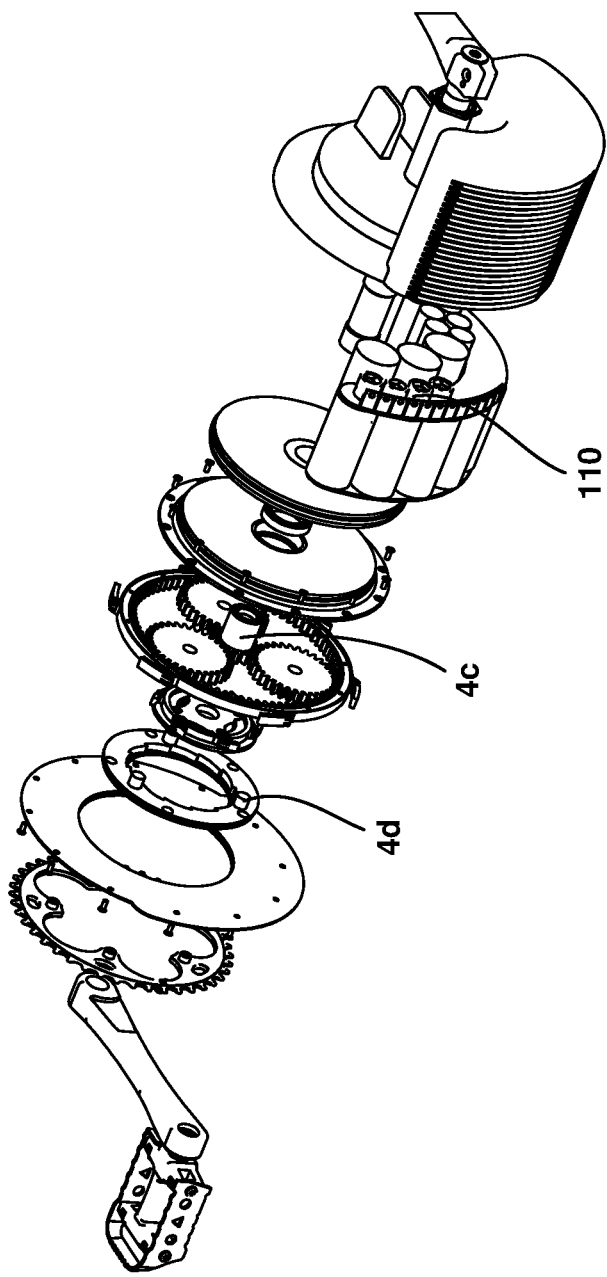
FIG. 11B is a left side exploded isometric view of a drive assembly according to the present disclosure.
Figure 12:
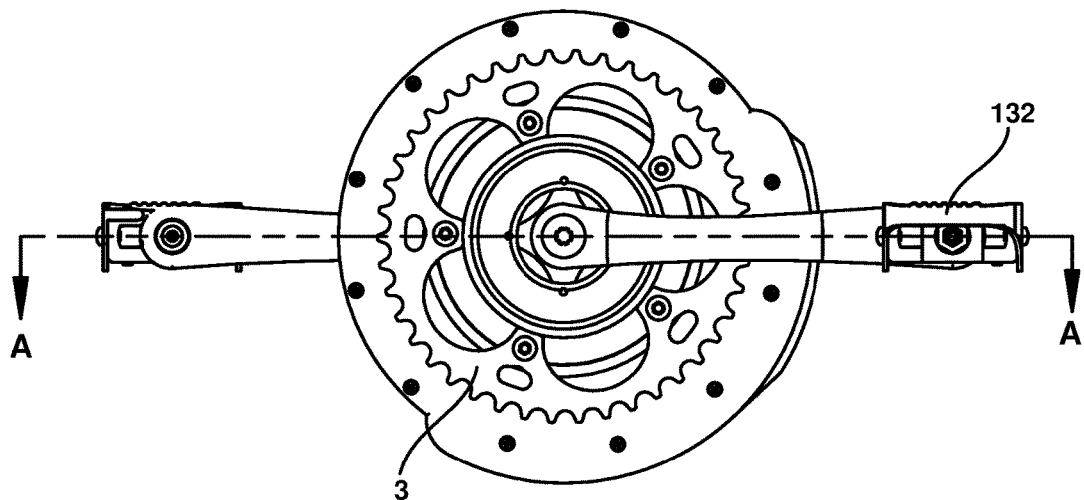
FIG. 12 is a side view of a drive assembly according to the present disclosure.
Figure 14:
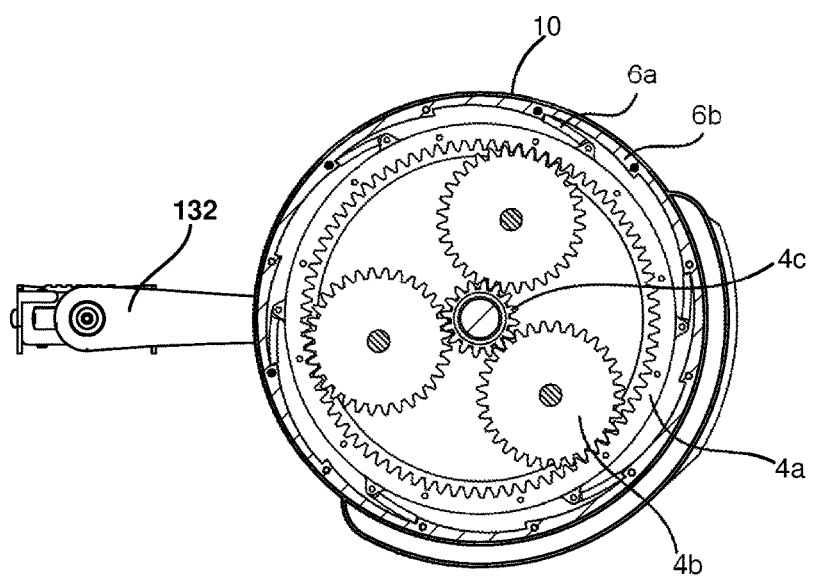
FIG. 14 is a cross-section through a planetary gear according to the present disclosure.

FIG. 14 shows a cross section of a planetary (epicyclic) gear 4, which comprises a planetary ring 4*a*, planets 4*b*, a planetary sun 4*c*, and a planets carrier 4*d* (shown in FIG. 11B). Planetary gear 4 is an exemplary mechanical implementation of energy splitter unit 102, and is mounted coaxially on crank axle 1 on bearings 5 (see FIG. 13). Outside front sprocket ratchet 2*b* is also connected to planets carrier 4*d* which is the carrier for planets 4*b*.

Figure 13:
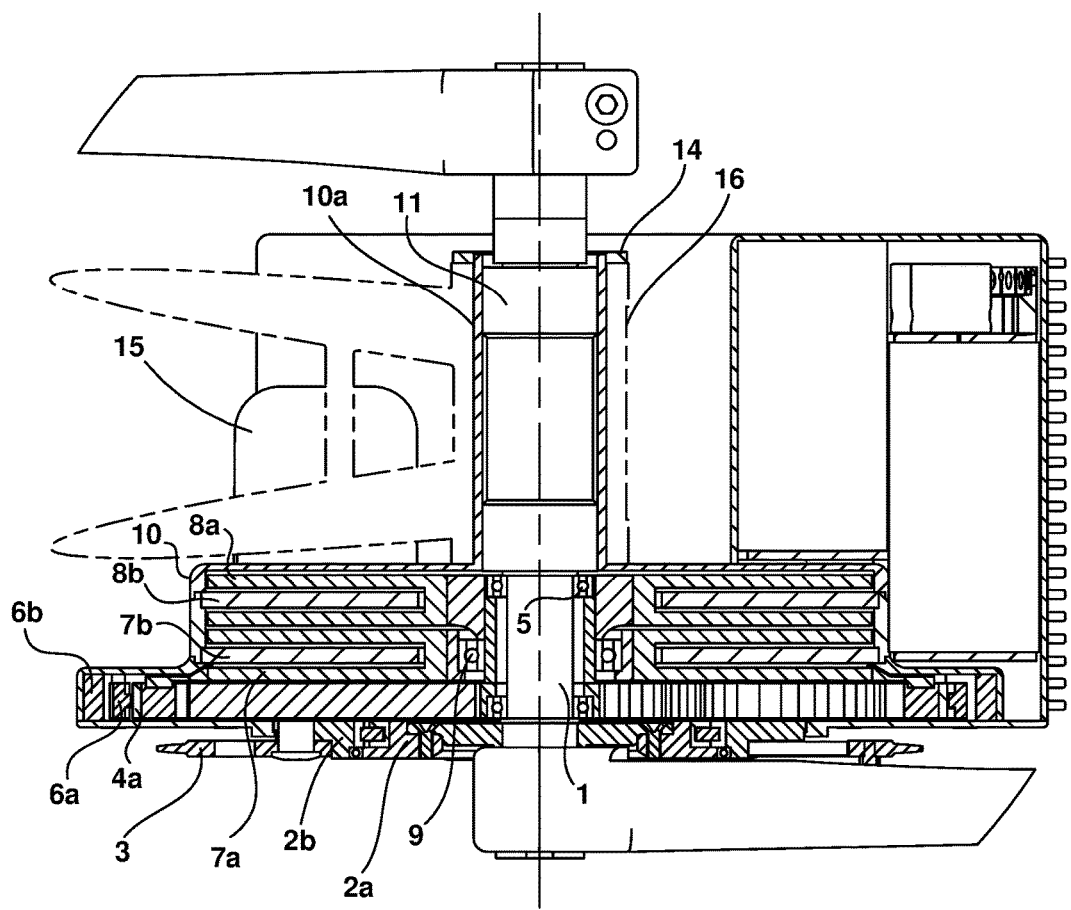
FIG. 13 is a horizontal cross-section of a drive assembly according to the present disclosure.
Figure 15:
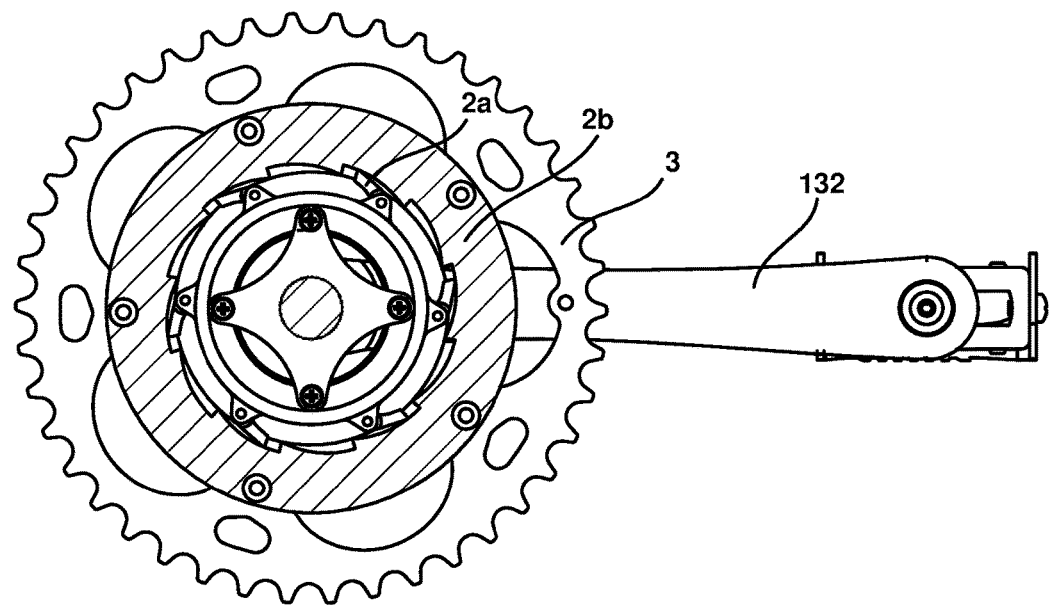
FIG. 15 is a cross-section through a front sprocket ratchet according to the present disclosure.
Figure 16:
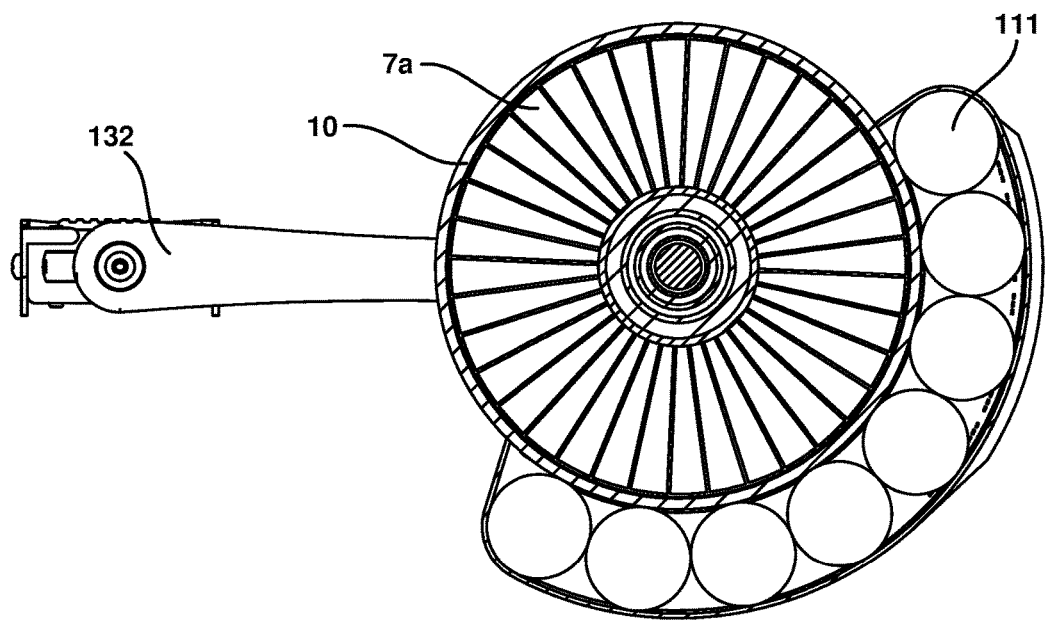
FIG. 16 is a cross-section through a motor/generator and high capacity storage elements according to the present disclosure.

A planetary ring ratchet 6 comprises an inside planetary ring ratchet 6*a* and an outside planetary ring ratchet 6*b* (see FIG. 13). Planetary ring 4*a* is connected to inside planetary ring ratchet 6*a*, while outside planetary ring ratchet 6*b* is fixed to a stationary housing 10. Note that stationary housing 10 is stationary relative to the frame of the light vehicle.

Inside and outside planetary ring ratchets 6*a* and 6*b* together form ring ratchet 6 which is a one-way clutch allowing rotation of the ring gear in CW direction only and locking the ring gear to stationary housing 10 in the CCW direction.

Motor/generators 7 (MG1) and 8 (MG2), having rotors 7*a* and 8*a* respectively and stators 7*b* and 8*b* respectively (see FIG. 13), are coaxially mounted on planetary sun 4*c* (see FIG. 11B). MG1 is mounted on a bearing 9, while MG2 is directly coupled to planetary sun 4*c*. MG2 is a mid/high torque drive unit, while MG1 is a low/mid torque drive unit. In an embodiment, both units may consist of dual Halbach array permanent magnet axial motor/generators. As shown in FIG. 13, both stators 7*b* and 8*b* are fixed to stationary housing 10.

Figure 2:
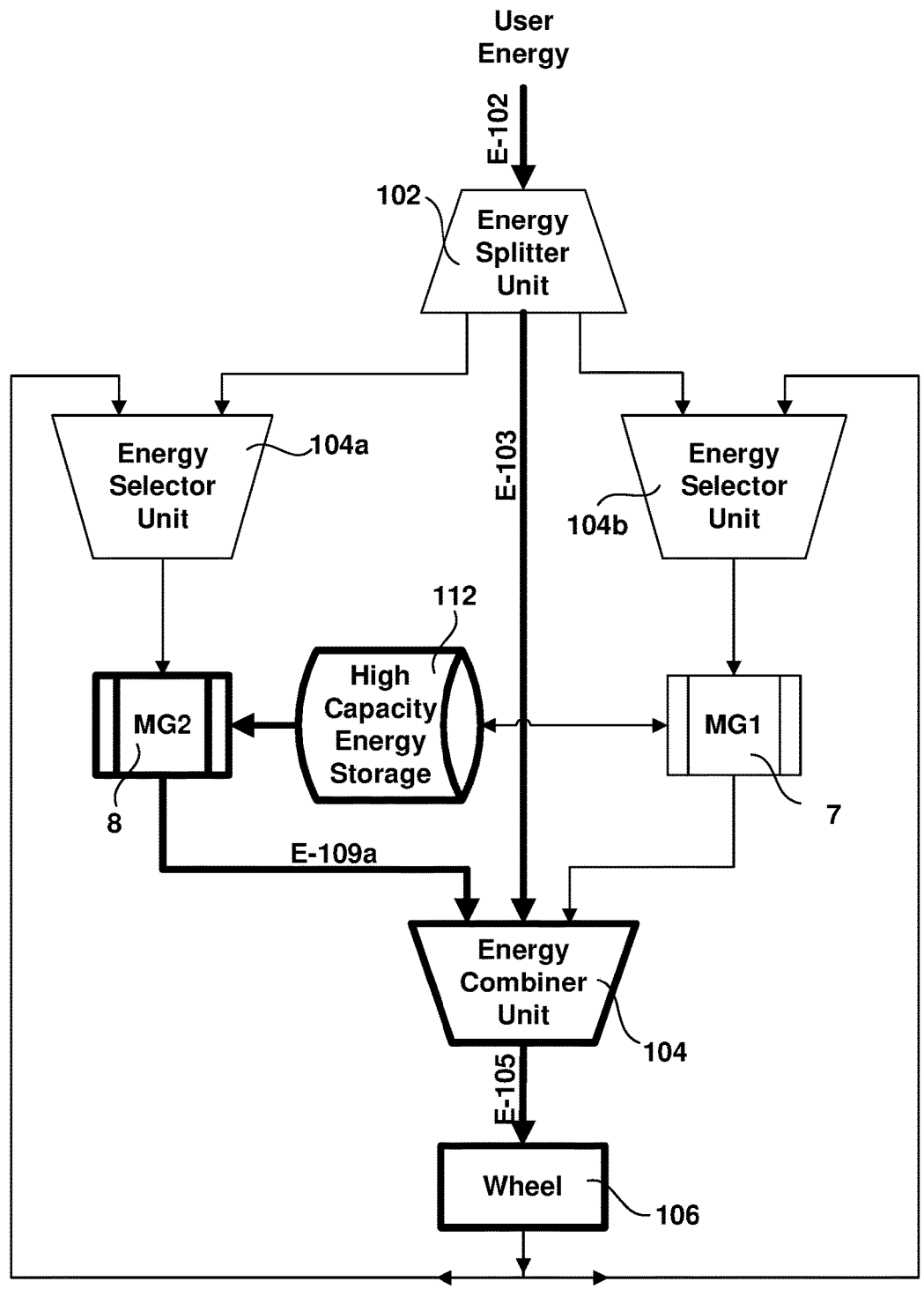
FIG. 2 is a schematic showing the flow of energy in cold start mode according to the present disclosure.

MG1 rotor 7*a* is connected to planetary ring 4*a* and can only rotate in CW direction due to planetary ring ratchet 6. The main function of ring ratchet 6 is to enable MG2 to transfer torque to front sprocket 3 during cold start, corresponding to energy E-109*a* as illustrated in FIG. 2.

Stationary housing 10 is the housing for drive assembly 100, and it is fixed to the light vehicle frame. Housing 10 may be split in sections to allow assembly. As shown in FIGS. 11A and 11B, housing 10 also encloses high capacity storage elements 111 and electronic control unit 110. Housing 10 may be fixed to the light vehicle frame by means of a housing bottom bracket mount 10*a* (see FIGS. 11A and 13). Housing bottom bracket mount 10*a* is a part of housing 10 that fits inside a commercially available bicycle bottom bracket 16. As shown in FIG. 11A, housing bottom bracket mount 10*a* is threaded at one end such that the threaded portion protrudes from bottom bracket 16 and allows installation of a locknut 14. A housing lug 15 locks the housing rotationally against the bicycle frame.

As shown in FIGS. 11 and 13, torque and cadence sensor 11 is directly coupled to crank axle 1. In an embodiment, sensor 11 may also incorporate the bearings for crank axle 1.

In an alternative embodiment of drive assembly 100, MG1 and MG2 are not coaxially mounted on the axis of planetary gear 4. In this embodiment, MG1 and MG2 may be mounted with their axis at a certain distance from the axis of planetary gear 4. Both motor/generators accomplish the same functions described in the first embodiment by means of a mechanical transmission that bridges the distance between the axis of MG1 and MG2 and the axis of planetary gear 4. Such a mechanical transmission may be accomplished, for example, with a gear set, or sprockets and timing belts.

MG1 and MG2 may alternatively be DC brushless permanent magnet motor/generators instead of the Halbach array type.

It should be noted that FIG. 10 illustrates a bicycle only as an exemplary embodiment. The invention may be installed on a pedicab, a wheelchair or any other light vehicle, and all such embodiments are within the scope of the present disclosure.

It should also be noted that planetary gear 4 may be implemented as a single stage gear as shown, or could alternatively be implemented as a multi-stage planetary gear system with various gear ratios as required to achieve a desired performance or to match the torque characteristics of a particular motor/generator. All such variations of implementation of the planetary gear system are within the scope of the present disclosure.

System Power Management

This section describes all usage cases of the energy harvesting power-assist system and energy flows for each case. The usage cases are illustrated in FIGS. 2-7 in which energy delivered to light vehicle wheel 106 is shown with bold lines, and energy that is harvested and stored in high capacity energy storage device 112 is shown in bold broken lines. Also in FIGS. 2-7 the active elements for each given usage case are shown with bold line borders.

Cold Start:

Power flows for cold start are shown in FIG. 2. The user starts pedaling to get the light vehicle in motion, MG2 assists by providing power in CW direction so as to reduce the initial required starting torque from the user. Ring ratchet 6 prevents MG1 from rotating in the CCW direction. Pedals 132 and front sprocket 3 are engaged in CW direction by front sprocket ratchet 2. The power flows are as follows:

Pedal 132→wheel 106 (Energy E-103)
MG1→open circuit
UCAP/BAT→MG2→wheel 106 (Energy E-109a)

Soft Coasting

Figure 3:
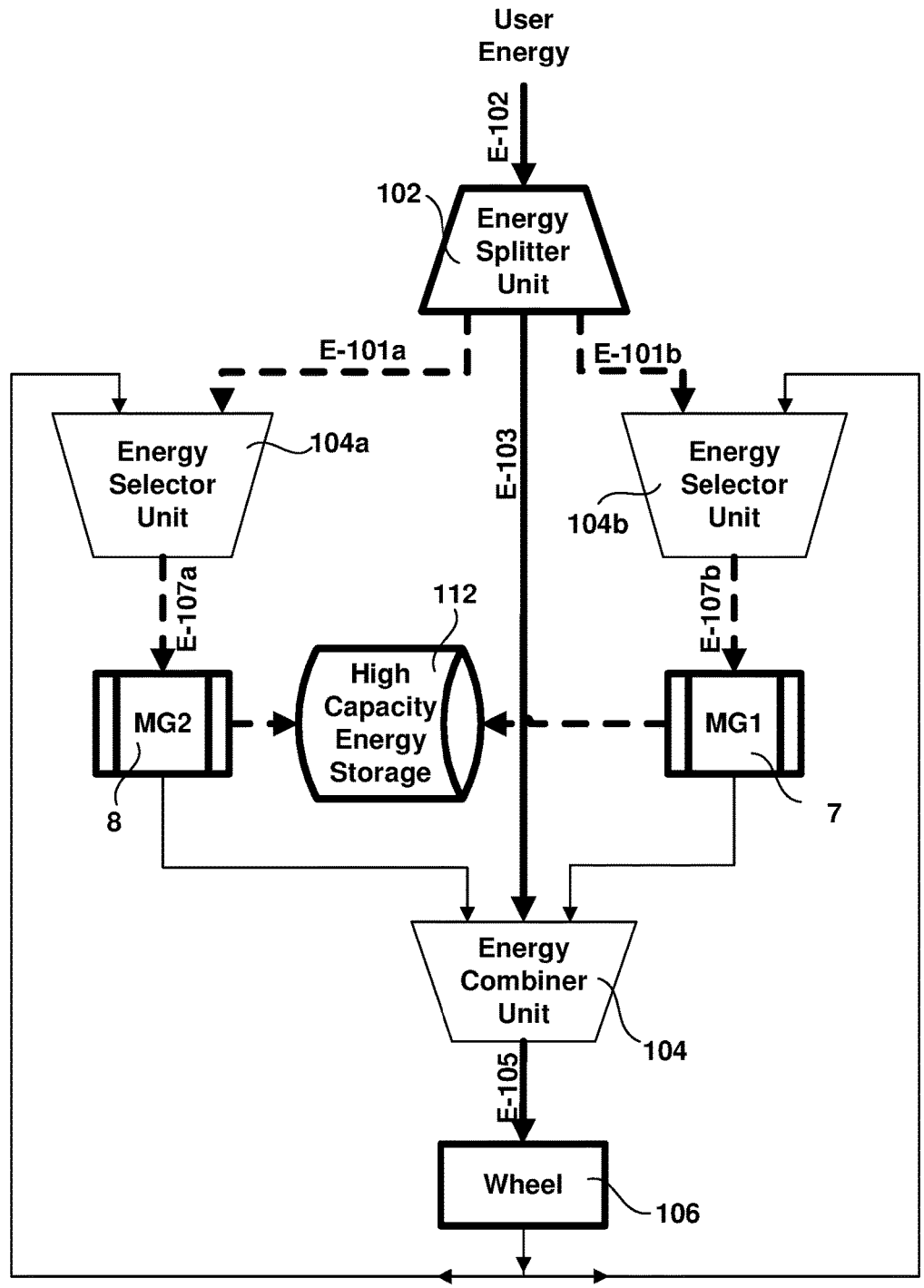
FIG. 3 is a schematic showing the flow of energy in soft coasting mode according to the present disclosure.

Power flows for soft coasting are shown in FIG. 3. Soft coasting is a low riding resistance case, typically when riding without headwind on a flat smooth surface. No pedal assist is required and the user pedals at a comfortable cadence (for example, 60-70 rpm) without exceeding effort level input S-110. Ring ratchet 6 prevents MG1 from rotating in the CCW direction. Pedals 132 and front sprocket 3 are engaged in CW direction by front sprocket ratchet 2. MG1 and MG2 rotate at approximately 200 rpm and 600 rpm respectively, and charge UCAP 111a and BAT 111b. The power flows are as follows:

Pedal 132→wheel 106 (Energy E-103)
Pedal 132→MG1→UCAP/BAT (Energy E-101b)
Pedal 132→MG2→UCAP/BAT (Energy E-101a)

Note that, depending on charge levels of UCAP 111a and BAT 111b, the harvested energy (E-101a+E-101b) may be between 5% and 20% of user energy E-102.

Hard Coasting

Figure 4:
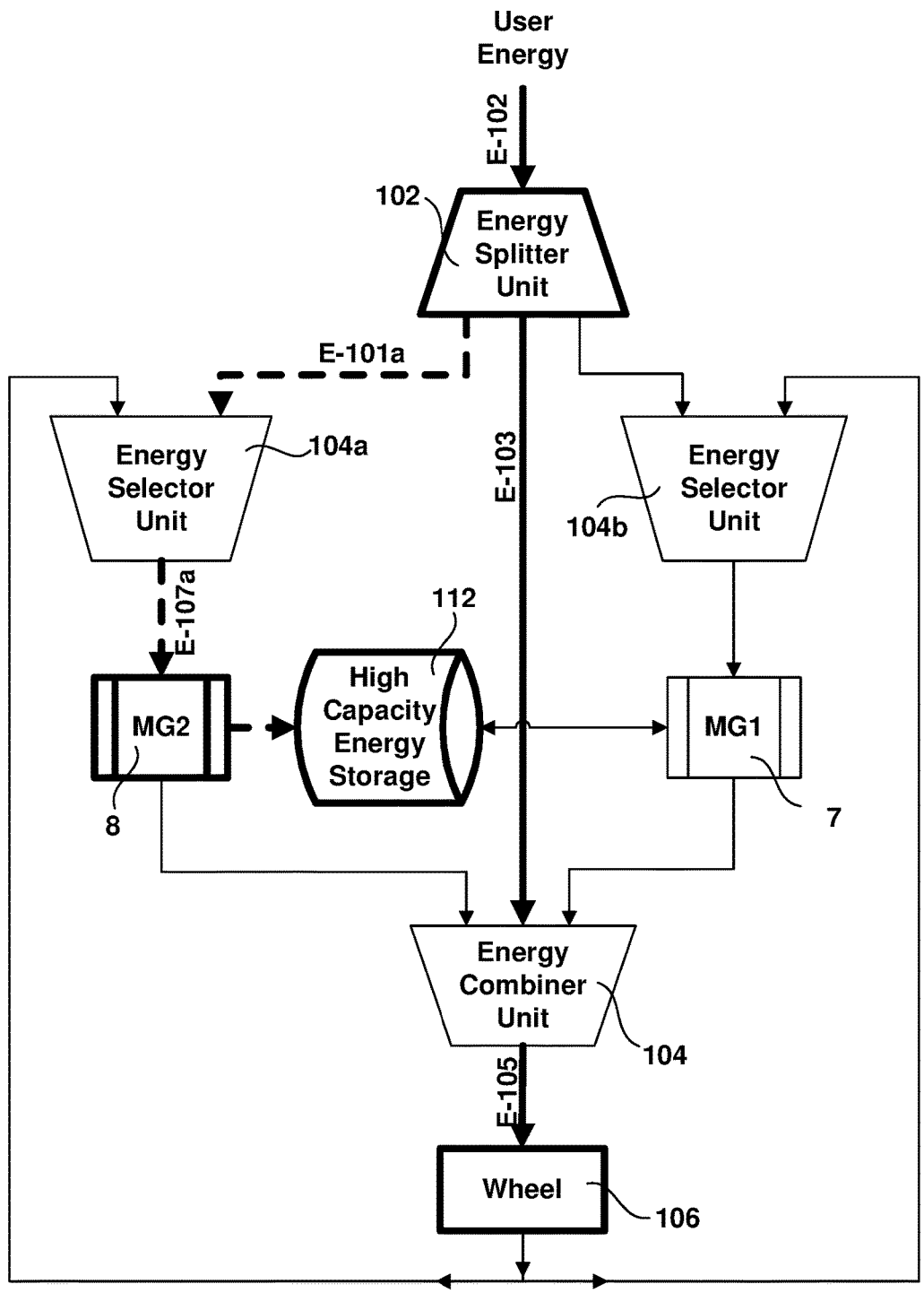
FIG. 4 is a schematic showing the flow of energy in hard coasting mode according to the present disclosure.

Power flows for hard coasting are shown in FIG. 4. Hard coasting is a low-mid riding resistance case, typically when riding with moderate headwind on a flat smooth surface. No pedal assist is required. The user pedals at a comfortable cadence (for example, 60-70 rpm) without exceeding effort level input S-110. Ring ratchet 6 prevents MG1 from rotating in the CCW direction. Pedals 132 and front sprocket 3 are engaged in CW direction by front sprocket ratchet 2. MG2 rotates at 400 rpm and charges UCAP/BAT. The power flows are as follows:

Pedal 132→wheel 106 (Energy E-103)
MG1→open circuit
Pedal 132→MG2→UCAP/BAT (Energy E-101a)

Note that, depending on charge levels of UCAP 111a and BAT 111b, the harvested energy (E-101a) may be between 1% and 10% of user energy E-102.

Soft Cruising

Figure 5:
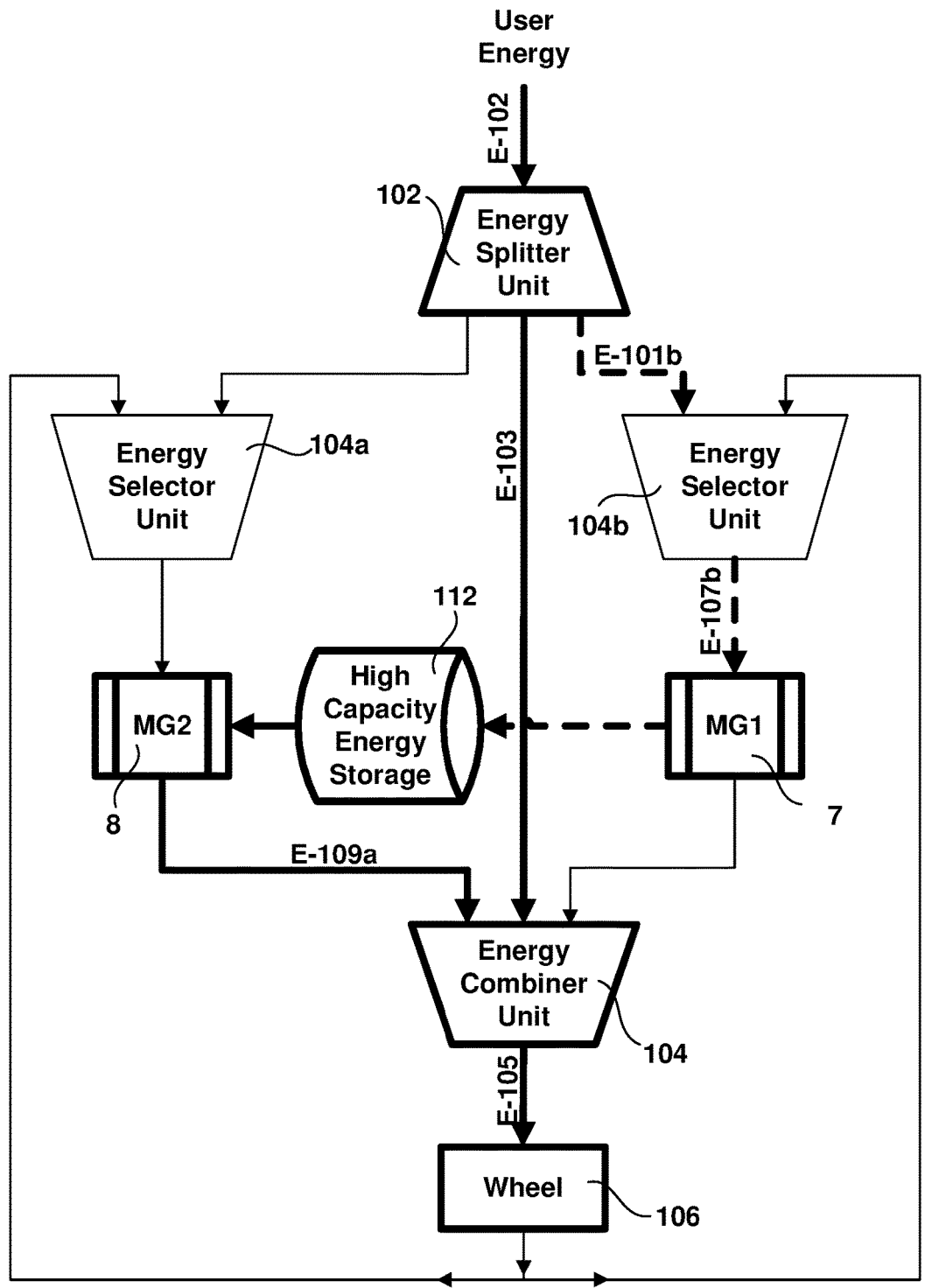
FIG. 5 is a schematic showing the flow of energy in soft cruising mode according to the present disclosure.

Power flows for soft cruising are shown in FIG. 5. Soft cruising is a medium riding resistance case, typically when riding with a light headwind and/or on a gentle slope. Pedal assist is required and is given by MG2. The rider pedals at a comfortable cadence (for example, 60-70 rpm) at effort level input S-110. Pedals 132 and front sprocket 3 are engaged in CW direction by front sprocket ratchet 2. Ring ratchet 6 prevents MG1 from rotating in the CCW direction. MG2 rotates in CW or CCW direction depending on the relative speeds of planets carrier 4d and planetary ring 4a and assists pedaling as needed. MG1 rotates in CW direction and charges UCAP/BAT. Control unit 110 charges UCAP 111a first, and when UCAP 111a is fully charged excess power is used to charge BAT 111b. MG2 draws the necessary power from UCAP 111a or BAT 111b. The power flows are as follows:

Pedal 132→wheel 106 (Energy E-103)
Pedal 132→MG1→UCAP/BAT (Energy E-101b)
UCAP/BAT→MG2→wheel 106 (Energy E-109a)

Note that, depending on charge levels of UCAP 111a and BAT 111b, the harvested energy (E-101b) may be between 1% and 10% of user energy E-102.

Hard Cruising

Figure 6:
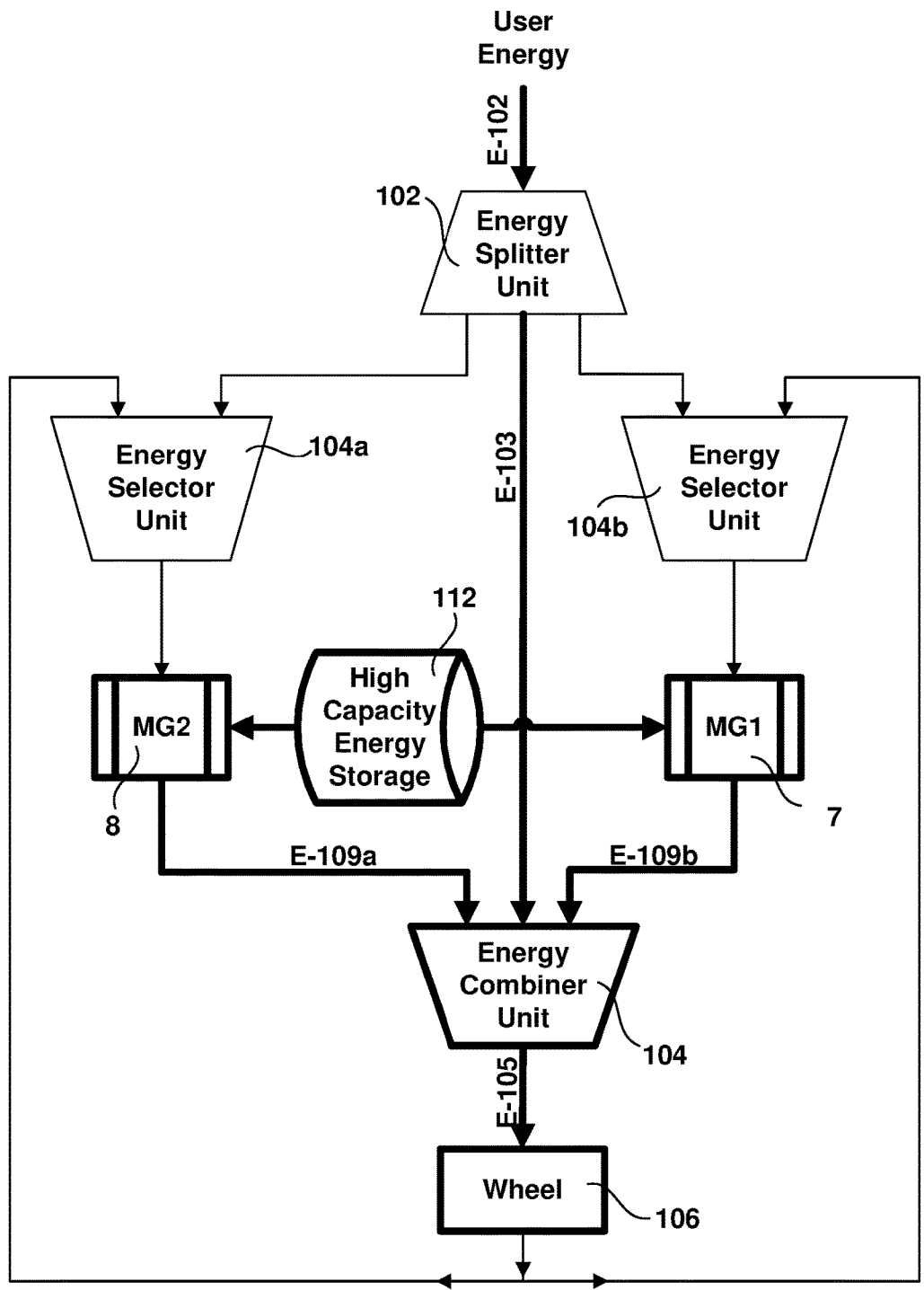
FIG. 6 is a schematic showing the flow of energy in hard cruising mode according to the present disclosure.

Power flows for hard cruising are shown in FIG. 6. Hard cruising is a high riding resistance case, typically when riding with strong headwind and/or on a steep slope (for example, slope >6%). Pedal assist is required and is delivered by both MG1 and MG2. The user pedals at a comfortable cadence (for example, 30-50 rpm) at effort level input S-110. Ring ratchet 6 prevents MG1 from rotating in the CCW direction. Pedals 132 and front sprocket 3 are engaged in CW direction by front sprocket ratchet 2. MG1 rotates in CW direction and assists pedaling as needed. MG2 rotates in CW or CCW direction depending on the relative speeds of planets carrier 4d and planetary ring 4a, and is equivalent to a low gear assist. MG1 and MG2 both draw the necessary power from UCAP 111a or BAT 111b. This hard cruising mode of operation is meant to be of relatively short duration, in the range of approximately 3 to 5 minutes. The power flows are as follows:

Pedal 132→wheel 106 (Energy E-103)
UCAP/BAT→MG1→wheel 106 (Energy E-109b)
UCAP/BAT→MG2→wheel 106 (Energy E-109a)

Kinetic Energy Harvesting

Figure 7:
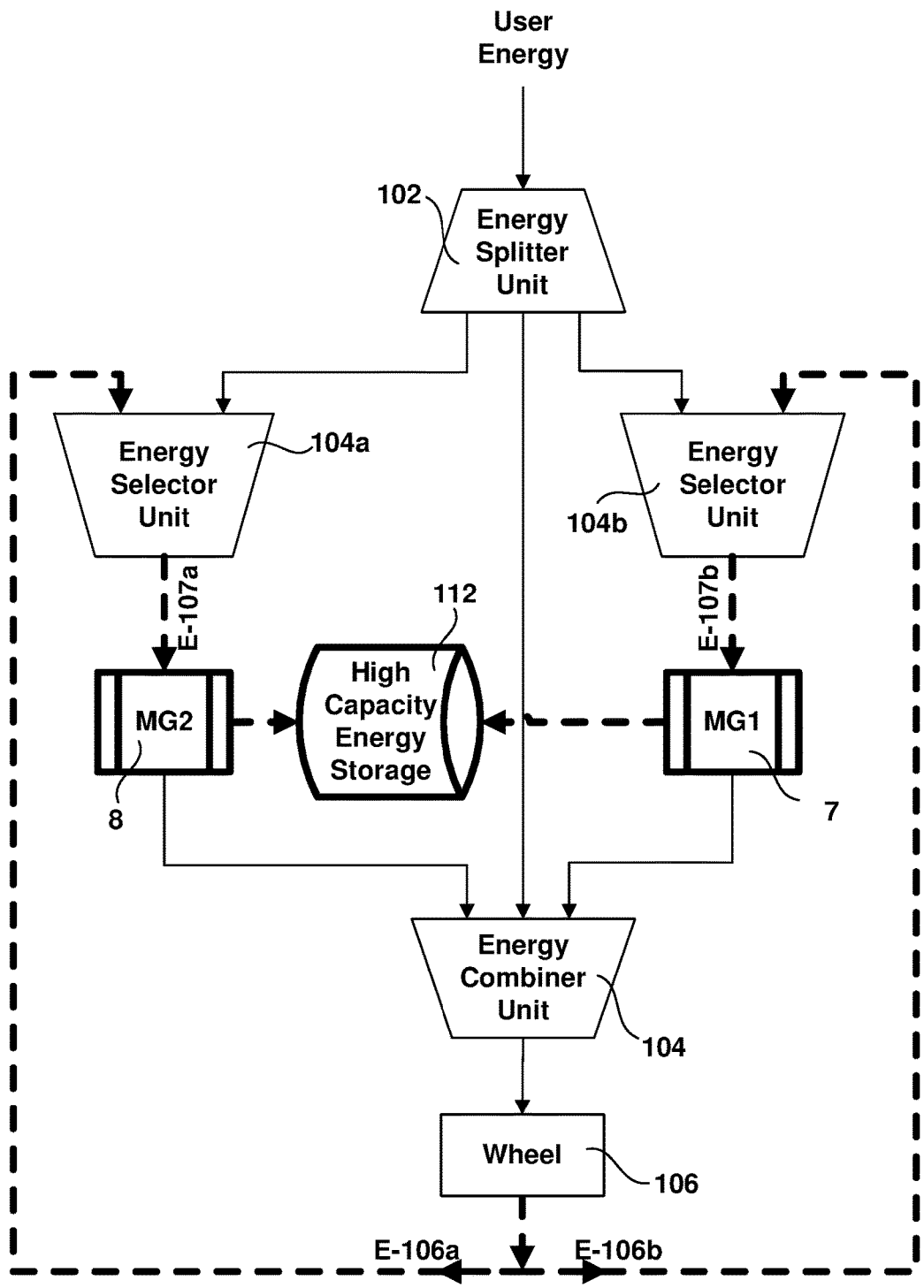
FIG. 7 is a schematic showing the flow of energy in kinetic energy harvesting mode according to the present disclosure.

Power flows for energy harvesting are shown in FIG. 7. Energy harvesting mode is typically employed when riding on flat or downhill surface and the user stops pedaling. Pedals 132 and front sprocket 3 are disengaged by front sprocket ratchet 2 because the relative rotation is CCW. Rear sprocket 12 is able to transfer wheel rotation to front sprocket 3 by means of chain or belt 13. Front sprocket 3 is thereby driven in CW direction, MG1 and MG2 also rotate CW and charge UCAP 111a and BAT 111b. The driven rotation of MG1 and MG2 may create significant drag, thereby slowing down the light vehicle. The power flows are as follows:

Wheel 106→MG1→UCAP/BAT (Energy E-106b)
Wheel 106→MG2→UCAP/BAT (Energy E-106a)

Note that in an alternative embodiment of the energy harvesting mode, either MG1 or MG2, or both MG1 and MG2, may be connected to harvest the kinetic energy. Controller 122 is configured to determine whether to connect MG1, MG2 or both based on the amount of available kinetic energy (depending on the speed of the light vehicle) and the energy storage levels of UCAP 111a and BAT 111b.

Table 2 shows a summary of the usage cases described above, including typical values of the torques and cadence (RPM) for each case.

TABLE 2

| | MG1 torque [Nm] | MG2 torque [Nm] | User torque [Nm] | MG1 cadence [RPM] | MG2 cadence [RPM] | Sprocket cadence [RPM] | Sprocket torque [Nm] |
|---|---|---|---|---|---|---|---|
| | | | | Usage Case | | | |
| Cold start | 0 | 12 | 1 | 0 | 12 | 2 | 13 |
| Soft Coasting | 0.5 | 0.2 | 10 | 200 | 600 | 70 | 9.3 |
| Hard Coasting | 0 | 0.2 | 10 | 0 | 400 | 70 | 9.8 |
| Soft Cruising | 0.5 | 12 | 10 | 200 | 700 | 50 | 21.5 |
| Hard Cruising | 3 | 12 | 10 | 250 | 1000 | 40 | 25 |
| Energy Harvesting | 1.5 | 0.4 | 0 | 500 | 1900 | 100 | 0 |

Figure 8:
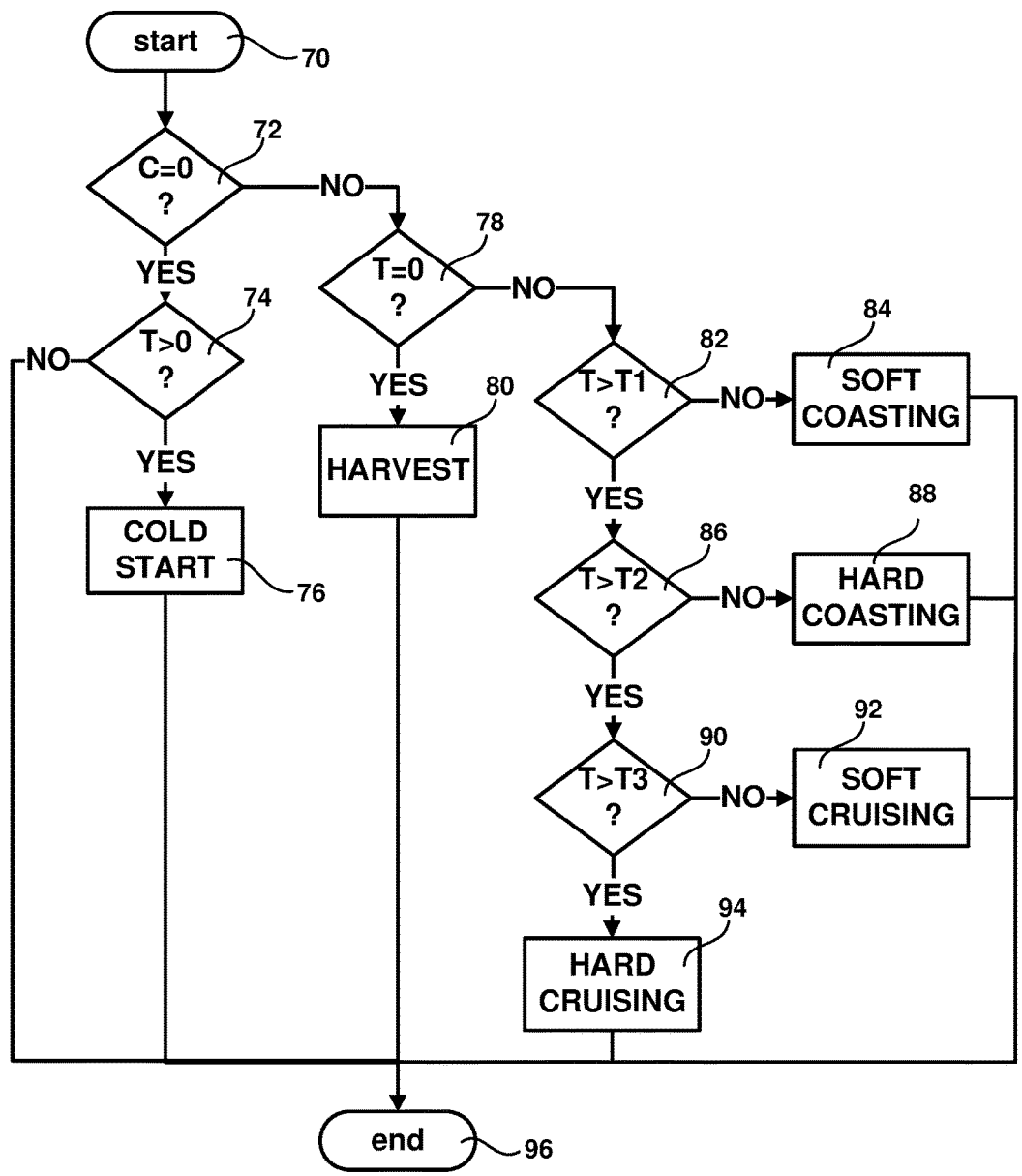
FIG. 8 is a flow chart of an energy flow control method according to the present disclosure.

FIG. 8 is a schematic diagram of a flow control method according to the present disclosure. In FIG. 8, the axle cadence measured by torque and cadence sensor 11 is designated by the symbol C, and the torque measured by torque and cadence sensor 11 is designated by the symbol T. The torque threshold equivalent to user-defined effort level input S-110 is designated by the symbol T2. A lower torque threshold T1 is calculated by control unit 110 and is given by T1=k1·T2, where k1 is a number between 0.5 and 0.9, with a preferred value of 0.7. An upper torque threshold T3 is calculated by control unit 110 and is given by T3=k3·T2, where k3 is a number between 1.1 and 1.5, with a preferred value of 1.3. Note that optimum values of k1 and k3 will depend on power/torque/rpm characteristics of the motors. Control unit 110 may also be configured to vary the values of k1 and k3 depending on the charging states of UCAP 111a and BAT 111b.

In step 70 the flow control method starts, and in step 72 the method determines whether C is zero (crank axle 1 is stationary). If so, and if T is greater than zero (step 74), then the cold start mode is entered in step 76. If C is greater than zero in step 72 (crank axle 1 is rotating), and if T is zero in step 78 (no torque required), then the energy harvesting mode is entered in step 80. If T is greater than zero in step 78, but T is not greater than T1 in step 82, then the soft coasting mode is entered in step 84. If T is greater than T1 in step 82, but T is not greater than T2 in step 86, then the hard coasting mode is entered in step 88. If T is greater than T2 in step 86, but T is not greater than T3 in step 90, then the soft cruising mode is entered in step 92. If T is greater than T3 in step 90, then the hard cruising mode is entered in step 94. The method ends at step 96, but returns to start again at step 70, so that the operating conditions of the light vehicle are continuously checked to determine whether a change in the power flow mode is required.

Although the present invention has been described in relation to particular embodiments thereof, it can be appreciated that various designs can be conceived based on the teachings of the present disclosure, and all are within the scope of the present disclosure.

What is claimed is:

1. An energy harvesting power-assist system for a light vehicle having a required user energy input, the power-assist system comprising:
   an energy splitter unit configured to split a user energy into a first split energy and a second split energy;
   a high capacity energy storage unit configured to store and release electrical energy, the high capacity energy storage unit comprising:
      a plurality of ultra-capacitors for providing energy for higher power demands of a short duration, and having multiple rapid charge/discharge cycles; and,
      a plurality of high capacity battery cells for providing energy for lower power demands of a long duration;
   a motor/generator assembly configured to convert the first split energy to electrical energy for storage in the high capacity energy storage unit, and to produce a motor mechanical energy by drawing electrical energy from the high capacity energy storage unit;
   a control unit;
   an energy combiner assembly configured to provide a user power-assist by combining the second split energy and the motor mechanical energy thereby providing a driving energy for driving a driven wheel of the light vehicle, and further configured to harvest a harvested kinetic energy from the driven wheel for conversion to electrical energy by the motor/generator assembly and storage in the high capacity energy storage unit;
   wherein the energy splitter unit, the motor/generator assembly, and the energy combiner assembly are integrated into a drive assembly having a drive assembly axis mounted coaxially with a pedal crank axle connected to pedals for input of the user energy; and,
   wherein the high capacity energy storage unit does not require re-charging by an external energy source.

2. The power-assist system of claim 1 wherein the control unit is configured to accept a user input of a maximum user energy, and further configured to control the high capacity energy storage unit and the motor/generator assembly so that the energy combiner assembly provides the motor mechanical energy when the required user energy exceeds the maximum user energy, and the energy combiner assembly harvests the harvested kinetic energy when the required user energy is less than the maximum user energy.

3. The power-assist system of claim 1 wherein the control unit is configured to control the charge/discharge cycles of the plurality of ultra-capacitors and a charge level of the plurality of high capacity battery cells so that the high capacity battery cells always retain a minimum charge level but the ultra-capacitors may be fully depleted.

4. The power-assist system of claim 1 wherein the high capacity energy storage unit, and the control unit are integrated into the drive assembly.

5. The power-assist system of claim 1 wherein the drive assembly has a front sprocket, the driven wheel has a driven wheel axle with a rear sprocket fixed to the driven wheel axle, and the front sprocket is connected to the rear sprocket by means of a chain or a belt, and wherein the front sprocket transmits the driving energy to the rear sprocket or receives the harvested kinetic energy from the rear sprocket.

6. The power-assist system of claim 5 wherein the energy splitter unit is implemented in the drive assembly by means of one or more planetary gear sets, and the energy combiner assembly is implemented in the drive assembly by means of the front sprocket.

7. The power-assist system of claim 6 wherein the drive assembly further comprises a first one-way clutch device configured to cause the pedal crank axle to engage with the front sprocket when the speed of rotation of the pedal crank axle is equal to or greater than a speed of rotation of the front sprocket, so that the front sprocket receives the user energy, and the first one-way clutch device is further configured to cause the pedal crank axle to disengage from the front sprocket when a speed of rotation of the pedal crank axle is less than the speed of rotation of the front sprocket, so that the front sprocket receives the harvested kinetic energy from the driven wheel.

8. The power-assist system of claim 7 wherein each of the one or more planetary gear sets has a ring gear, and the drive assembly further comprises a second one-way clutch device configured to allow at least one ring gear to rotate in a first rotation direction and to lock the at least one ring gear to a stationary housing of the drive assembly in a second rotation direction.

9. The power-assist system of claim 1 wherein the motor/generator assembly comprises two motor/generator units having a pancake form factor and mounted coaxially with the drive assembly axis.

10. The power-assist system of claim 9 wherein the control unit comprises a DC-AC inverter and each of the two motor/generator units includes at least one phase sensor, and an output signal of each phase sensor is connected to the DC-AC inverter.

11. The power-assist system of claim 1 wherein the control unit is configured to control the motor/generator assembly such that, when the energy combiner assembly is providing the motor mechanical energy, the user energy remains constant at a maximum user energy.

12. The power-assist system of claim 1 wherein the control unit comprises an auxiliary inputs and connectivity unit for receiving data input from a BLUETOOTH device, a Global Positioning System device, an accelerometer or an inclinometer.

13. The power-assist system of claim 12 wherein the BLUETOOTH device is connected to a smartphone and wherein a user input of the maximum user energy is implemented by means of the smartphone.

14. The power-assist system of claim 1 wherein the control unit comprises an auxiliary power DC-DC converter configured to provide power to headlights or other accessories of the light vehicle.

15. The power-assist system of claim 1 wherein the control unit is further configured to receive input from a torque and cadence sensor.

16. The power-assist system of claim 15 wherein the torque and cadence sensor is located at the pedal crank axle.

17. The power-assist system of claim 1 wherein the plurality of ultra-capacitors comprises thin supercapacitors.

18. The power-assist system of claim 1 wherein the short duration is less than 10 minutes and the long duration is greater than 10 minutes.

19. A method of controlling power flow in a power-assist system for a light vehicle, wherein a user energy is applied to a pedal crank axle connected to a driven wheel, the power-assist system comprising a first motor/generator, a second motor/generator and a high capacity storage unit, the power-assist system providing a motor power to the driven wheel or receiving a generator power for storage in the high capacity storage unit, the method comprising the steps of:
receiving a user data input of a maximum user torque threshold;
measuring a measured torque at the pedal crank axle;
measuring a measured cadence of the pedal crank axle;
entering a cold start power flow mode if the measured cadence is zero and the measured torque is greater than zero;
entering a kinetic energy harvesting power flow mode if the measured cadence is greater than zero and the measured torque is zero;
entering a soft coasting power flow mode if the measured cadence is greater than zero and the measured torque is greater than zero but less than a lower torque threshold;
entering a hard coasting power flow mode if the measured cadence is greater than zero and the measured torque is greater than the lower torque threshold but less than the maximum user torque threshold;
entering a soft cruising power flow mode if the measured cadence is greater than zero and the measured torque is greater than the maximum user torque threshold but less than an upper torque threshold; and,
entering a hard cruising power flow mode if the measured cadence is greater than zero and the measured torque is greater than the upper torque threshold.

20. The method of claim 19 wherein the lower torque threshold is equal to a first constant times the maximum user torque threshold, wherein the first constant has a value between 0.5 and 0.9, and wherein the upper torque threshold is equal to a second constant times the maximum user torque threshold, wherein the second constant has a value between 1.1 and 1.5.

21. The method of claim 19 wherein the step of entering the cold start power flow mode further comprises the steps of:
disconnecting the first motor/generator from the driven wheel;
connecting the second motor/generator to the driven wheel; and,
providing the motor power from the second motor/generator to the driven wheel.

22. The method of claim 19 wherein the step of entering the kinetic energy harvesting power flow mode further comprises the steps of:
connecting one or both of the first motor/generator and the second motor/generator to the driven wheel;
receiving the generator power at the first motor/generator and/or the second motor/generator; and,
transmitting the generator power from the first motor/generator and/or the second motor/generator to the high capacity storage unit.

23. The method of claim 19 wherein the step of entering the soft coasting power flow mode further comprises the steps of:
splitting between 5% and 20% of the user energy to drive the first motor/generator and the second motor/generator;
allowing the remaining 95% to 80% of the user energy to be applied to the driven wheel;
transmitting the generator power from the first motor/generator and the second motor/generator to the high capacity storage unit.

24. The method of claim 19 wherein the step of entering the hard coasting power flow mode further comprises the steps of:
- disconnecting the first motor/generator from the driven wheel;
- splitting between 1% and 10% of the user energy to drive the second motor/generator;
- allowing the remaining 99% to 90% of the user energy to be applied to the driven wheel;
- transmitting the generator power from the second motor/generator to the high capacity storage unit.

25. The method of claim 19 wherein the step of entering the soft cruising power flow mode further comprises the steps of:
- splitting between 1% and 10% of the user energy to drive the first motor/generator;
- allowing the remaining 99% to 90% of the user energy to be applied to the driven wheel;
- transmitting the generator power from the first motor/generator to the high capacity storage unit;
- connecting the second motor/generator to the driven wheel; and,
- providing the motor power from the second motor/generator to the driven wheel.

26. The method of claim 19 wherein the step of entering the hard cruising power flow mode further comprises the steps of:
- connecting the first motor/generator to the driven wheel;
- connecting the second motor/generator to the driven wheel; and,
- providing the motor power from the first motor/generator and the second motor/generator to the driven wheel.

* * * * *